US010889270B2

(12) United States Patent
Meyer et al.

(10) Patent No.: US 10,889,270 B2
(45) Date of Patent: Jan. 12, 2021

(54) DIFFERENTIAL HAVING A BRAKE DEVICE

(71) Applicant: Continental Teves AG & Co. oHG, Frankfurt (DE)

(72) Inventors: Ulrike Meyer, Frankfurt (DE); Martin Semsch, Maibach-Butzbach (DE); Uwe Bach, Niedernhausen (DE); Jens Hoffmann, Darmstadt (DE); Ahmed Sefo, Frankfurt (DE); Wolfgang Ritter, Oberursel/TS. (DE); Martin Gädke, Hofheim/Ts. (DE); Holger von Hayn, Bad Vilbel (DE); Adrian Messner, Mainz (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 82 days.

(21) Appl. No.: 16/317,868

(22) PCT Filed: Aug. 8, 2017

(86) PCT No.: PCT/EP2017/070109
§ 371 (c)(1),
(2) Date: Jan. 15, 2019

(87) PCT Pub. No.: WO2018/029211
PCT Pub. Date: Feb. 15, 2018

(65) Prior Publication Data
US 2019/0232927 A1    Aug. 1, 2019

(30) Foreign Application Priority Data

Aug. 11, 2016 (DE) .................. 10 2016 214 968

(51) Int. Cl.
*F16H 48/22* (2006.01)
*B60T 1/06* (2006.01)
(Continued)

(52) U.S. Cl.
CPC .............. *B60T 1/062* (2013.01); *F16D 49/16* (2013.01); *F16D 51/20* (2013.01); *F16D 65/16* (2013.01); *F16H 48/20* (2013.01); *F16H 48/22* (2013.01)

(58) Field of Classification Search
CPC .... F16H 48/20; F16H 48/22; F16H 48/10–11; F16D 49/16; F16D 51/20; B60K 2001/001
See application file for complete search history.

(56) References Cited

U.S. PATENT DOCUMENTS 1,448,670 A * 3/1923 Marcy .................... F16H 48/30
475/238
2,936,035 A    5/1960 Hill
(Continued)

FOREIGN PATENT DOCUMENTS

CH            276589 A     7/1951
CN          1692236 A    11/2005
(Continued)

OTHER PUBLICATIONS

German Search Report for German Application No. 10 2016 214 968.7, dated Feb. 23, 2017, with partial translation—10 pages.
(Continued)

*Primary Examiner* — David R Morris
*Assistant Examiner* — Lillian T Nguyen
(74) *Attorney, Agent, or Firm* — RatnerPrestia

(57) ABSTRACT

Differentials having plate packs for exerting a braking torque onto the output shafts of the gear unit are known. The brake device is intended to be designed such that effective braking can be achieved using it and that it is easy to service. To this end, the invention makes provision for the brake device to be a drum brake having a passive element, exhibiting a cylindrical frictional surface, and brake shoes, (Continued)

the frictional surfaces of which brake shoes can be placed against the cylindrical frictional surface of the passive element. The passive element can be a brake drum or a radial brake disk, the cylindrical edge of which serves as a frictional surface. The passive element is fastened to the differential cage and/or one of the shafts. The brake shoes are held in a pivotable manner on a carrier plate fastened to the outside of the differential housing.

10 Claims, 3 Drawing Sheets

(51) Int. Cl.

| | | |
|---|---|---|
| *F16D 49/16* | (2006.01) | |
| *F16D 51/20* | (2006.01) | |
| *F16D 65/16* | (2006.01) | |
| *F16H 48/20* | (2012.01) | |

(56) References Cited

U.S. PATENT DOCUMENTS

| | | | |
|---|---|---|---|
| 3,517,572 A | | 6/1970 | Schmid |
| 3,621,957 A | | 11/1971 | Howe |
| 4,932,278 A | | 6/1990 | Nemoto |
| 6,318,535 B1 | * | 11/2001 | Herffurth ............... B60T 1/062 |
| | | | 188/71.1 |
| 6,770,005 B2 | | 8/2004 | Aikawa et al. |
| 7,182,182 B2 | | 2/2007 | Dupuis |
| 7,448,978 B2 | | 11/2008 | Habel |
| 7,686,141 B2 | | 3/2010 | Shirokoshi et al. |
| 2003/0158012 A1 | * | 8/2003 | Kwoka ............... F16H 48/27 |
| | | | 475/224 |
| 2003/0203782 A1 | * | 10/2003 | Casey ............... B60K 17/046 |
| | | | 475/150 |
| 2014/0141918 A1 | * | 5/2014 | Fukami ............... B60K 17/165 |
| | | | 475/150 |
| 2015/0068831 A1 | | 3/2015 | Ebner |

FOREIGN PATENT DOCUMENTS

| | | |
|---|---|---|
| CN | 101054059 A | 10/2007 |
| CN | 201461893 U | 5/2010 |
| DE | 3813528 A1 | 11/1988 |
| DE | 3935115 A1 | 5/1990 |
| DE | 10026558 A1 | 6/2001 |
| DE | 10327458 A1 | 1/2005 |
| DE | 102005018907 A1 | 11/2006 |
| DE | 102009018828 A1 | 11/2010 |
| DE | 102011008846 A1 | 7/2011 |
| JP | 18108085 U | 12/1973 |
| JP | 62110034 A | 5/1987 |
| JP | 2000247215 A | 9/2000 |
| JP | 2006198377 A | 8/2006 |
| JP | 2010202190 A | 9/2010 |
| KR | 20000029742 A | 5/2000 |
| WO | 2007000857 A1 | 1/2007 |

OTHER PUBLICATIONS

International Search Report and Written Opinion for International Application No. PCT/EP2017/070109, dated Jan. 4, 2018—8 pp.
Chinese Office Action for Chinese Application No. 201780041983.5, dated Dec. 10, 2019, with translation, 13 pages.
Notice of Reasons for Refusal for Japanese Application No. 2019-507222, dated Feb. 13, 2020, with translation, 14 pages.
Korean Notice to Submit a Response for Korean Application No. 10-2019-7004789, dated Oct. 26, 2020, with translation, 10 pages.
Japanese Notice of Reasons for Refusal for Japanese Application No. 2019-507222, dated Sep. 30, 2020, with translation, 6 pages.

\* cited by examiner

DIFFERENTIAL HAVING A BRAKE DEVICE

CROSS REFERENCE TO RELATED APPLICATIONS

This application is the U.S. National Phase Application of PCT International Application No. PCT/EP2017/070109, filed Aug. 8, 2017, which claims priority to German Patent Application No. 10 2016 214 968.7, filed Aug. 11, 2016, the contents of such applications being incorporated by reference herein.

FIELD OF THE INVENTION

The invention relates to a differential having a brake device, comprising a drive shaft, two output shafts, a differential housing which has an inlet opening for the drive shaft and two opposite outlet openings for the output shafts, a differential cage and comprising at least one brake device.

BACKGROUND OF THE INVENTION

A differential of this kind is described, for example, in DE 38 13 528 A1, incorporated herein by reference. According to said document, the differential exhibits in each case one brake device on its two output shafts. Said brake devices each consist of a large number of plates which project radially away from the respective output shaft and protrude between counterplates which are fastened to the differential housing. The plate stack which is formed in this way is hydraulically compressed in the axial direction in order to generate a braking torque on the output shafts. A similar differential can also be found in DE 39 35 115 A1, incorporated herein by reference. DE 10 2005 018 907 A1, incorporated herein by reference provides a multiplate brake arrangement of this kind on the drive shaft.

These arrangements have the disadvantage that the plate stacks are difficult to service since they are arranged within the differential housing of the differential.

SUMMARY OF THE INVENTION

An aspect of the invention aims to simplify the brake device on a differential from a structural point of view.

An aspect of the invention makes provision for the at least one brake device to be a drum brake which has a passive element, which exhibits a cylindrical frictional surface, and brake shoes, the frictional surfaces of which brake shoes can be placed against the cylindrical frictional surface of the passive element, for the passive element to be fastened to the differential cage and/or one of the shafts in such a way that its cylindrical frictional surface is arranged coaxially in relation to one of the openings, and for the brake shoes to be held in a pivotable manner on a carrier plate which is flange-connected to the edge of said opening.

Since, according to this construction, the brake device is arranged as a separate component outside the differential housing but directly connected thereto, the brake device is easily accessible, in particular for servicing purposes.

The passive element, which is that element of the brake device which is not adjustable, is preferably formed by a pot which consists of a base and an encircling wall, wherein the inner side of the wall forms the cylindrical frictional surface. The open side of the pot faces the differential housing of the differential, wherein the brake shoes are arranged within the pot. In this way, the brake shoes, which are adjustable in relation to the passive element, are situated in an encapsulated and protected manner in a chamber which is formed by the carrier plate and the brake drum.

As an alternative, the passive element can be formed by a radial brake disk, the lateral surface of which radial brake disk forms the cylindrical frictional surface.

In order to achieve an encapsulated arrangement of the brake shoes here too, a cover is detachably fastened on the carrier plate, so that the carrier plate together with the brake shoes and the radial brake disk are enclosed.

In each case one brake device is preferably installed on the two output shafts.

A better braking effect is achieved when the passive element of one brake device is coupled to the differential cage, and the passive element of the other brake device is coupled to one of the output shafts.

In order that the passive element can be fastened to the differential cage, said differential cage, on a side which is coaxial in relation to the output shaft there, is extended by means of an extension sleeve.

In some cases, it suffices for a single brake device to be arranged on the drive shaft. The braking effect of said single brake device continues across the differential cage to the output shafts.

In order to be able to operate the brake device, provision is made for the carrier plate to project radially outward beyond the differential housing, and to have, on its rear side, a hydraulic or electrical connection for the actuating device of the brake shoes.

An aspect of the invention can also be employed particularly effectively in differentials which are directly coupled to an electric motor. Here, arrangements of very compact construction are known, in the case of which the gear unit itself is of relatively flat design and is arranged on the end side of an electric motor.

In this case, a second, weaker electric motor is provided, which electric motor likewise contributes to torque compensation.

An aspect of the invention therefore makes provision for said second electric motor to be replaced by appropriate brake devices, as are described above.

To this end, provision is made for the differential cage to be coupled to the output shaft of an electric motor, wherein the output shaft is of hollow design and runs coaxially in relation to one of the output shafts of the differential.

In order to obtain a compact shape of the differential, provision is made for a compensating gear in the form of a spur gear to be mounted deaxially in relation to the output shafts in the differential cage, and for the output shafts, by way of in each case one output gear which is likewise designed as a spur gear, to engage into the toothing of the compensating gear.

The electric motor and the differential cage are preferably accommodated in a common cylindrical housing, wherein the output shafts are passed through the end sides of the housing. The brake devices can then be arranged on one or both end sides.

BRIEF DESCRIPTION OF THE DRAWINGS

Aspects of the invention will be explained in more detail below on the basis of three exemplary embodiments. In the figures.

DETAILED DESCRIPTION OF THE PREFERRED EMBODIMENTS

Figure 1:
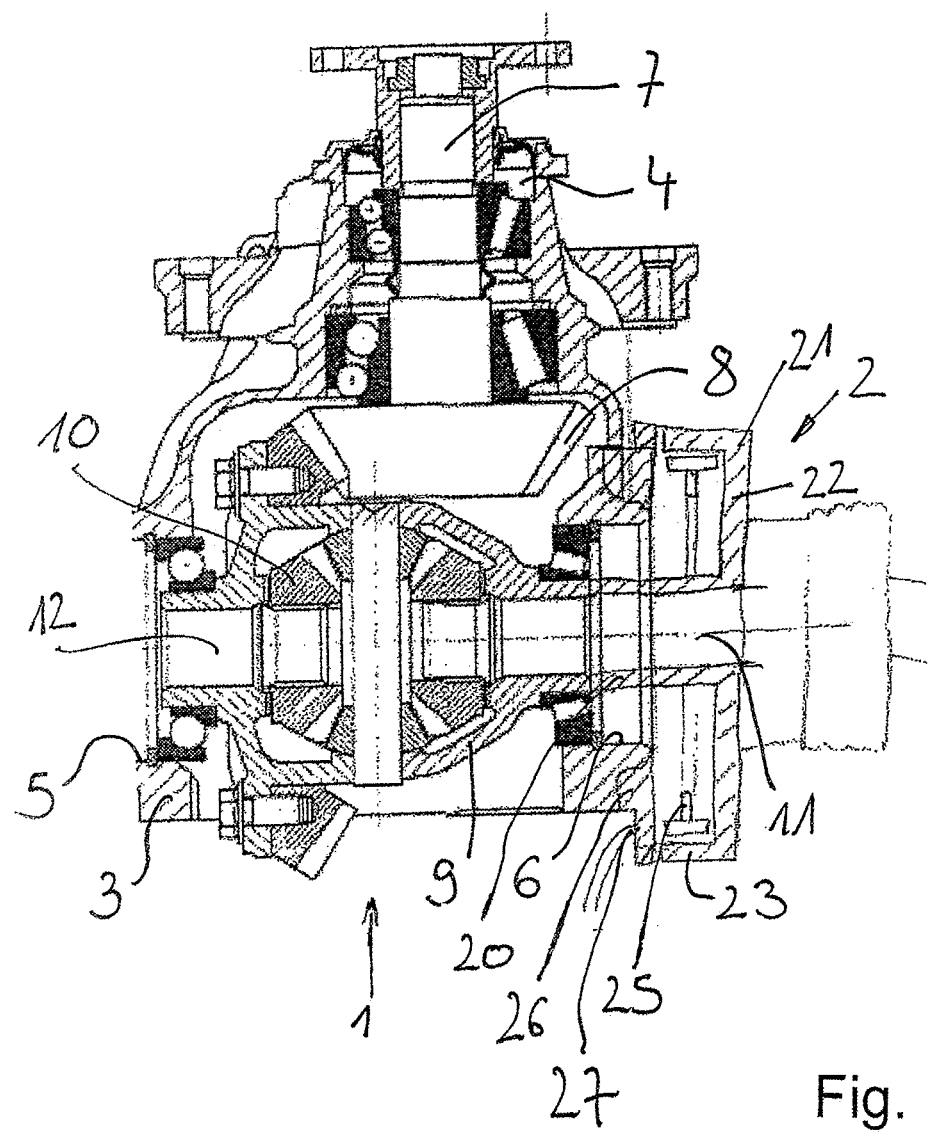
FIG. 1: shows a first embodiment of the invention.

For the purpose of describing the differential, reference is first of all made to the first two figures. Said figures each show, in section, a differential 1 which is provided with a brake device 2.

The differential 1 has a differential housing 3 comprising an inlet opening 4 and two outlet openings 5 and 6. A drive shaft 7 is rotatably mounted in the inlet opening 4. Said drive shaft drives, by means of a bevel gear 8, a differential cage 9 which is rotatably mounted in the differential housing 3 transversely in relation to the axis of the drive shaft 7.

The differential cage 9 contains a bevel gear arrangement 10 with the aid of which a first output shaft 11 and a second output shaft 12, which project laterally out of the outlet openings 5 and 6, are driven. The output shafts are connected to the front and, respectively, rear wheels of a vehicle, while the drive shaft 7 is coupled to the motor of the vehicle.

If the two output shafts 11, 12 are loaded in the same way, the bevel gear arrangement 10 is, in effect, blocked. The rotation speed of the output shafts 11, 12 corresponds to the rotation speed of the differential cage 9. If one drive shaft can rotate only more slowly than the other because, for example when traveling around a bend, the one drive shaft drives the inner wheel, rotation speed compensation is performed by means of the bevel gear arrangement 10.

The brake device 2 acts on the differential cage 9 and therefore, when it is operated, brakes the two output shafts. To this end, the differential cage 9 exhibits an extension sleeve 20, which is passed out of one of the outlet openings 6, and is connected in a rotationally fixed manner to a passive element of the brake device 2.

In accordance with the design according to FIG. 1, the brake device is realized by a drum brake, as is customary in vehicle engineering. Accordingly, the passive element is a pot-like brake drum 21 which consists of a disk-like base 22 and an encircling wall 23 on said base, the inner side of the encircling wall forming a cylindrical frictional surface which serves as a braking surface for two brake shoes 25. The extension sleeve 20 is connected in a rotationally fixed manner to the center of the base 22.

The brake shoes 25 are arranged in a pivotable manner on a carrier plate 26 which is arranged around the opening 6 and coaxially in relation thereto and is fastened to the differential housing 3.

Operating devices, for example hydraulic or electromotive operating devices for the brake shoes 25, are located on the carrier plate 26—this not being illustrated in any detail here. Said operating devices are supplied with power by means of a connection 27 which is located on the rear side of the carrier plate 26, specifically in a region which protrudes radially beyond the differential housing 3. The brake drum 21 has approximately the same outside diameter as the carrier plate 26, so that said brake drum and carrier plate form a chamber in which the brake shoes 25 are located in a manner protected against external effects.

Figure 2:
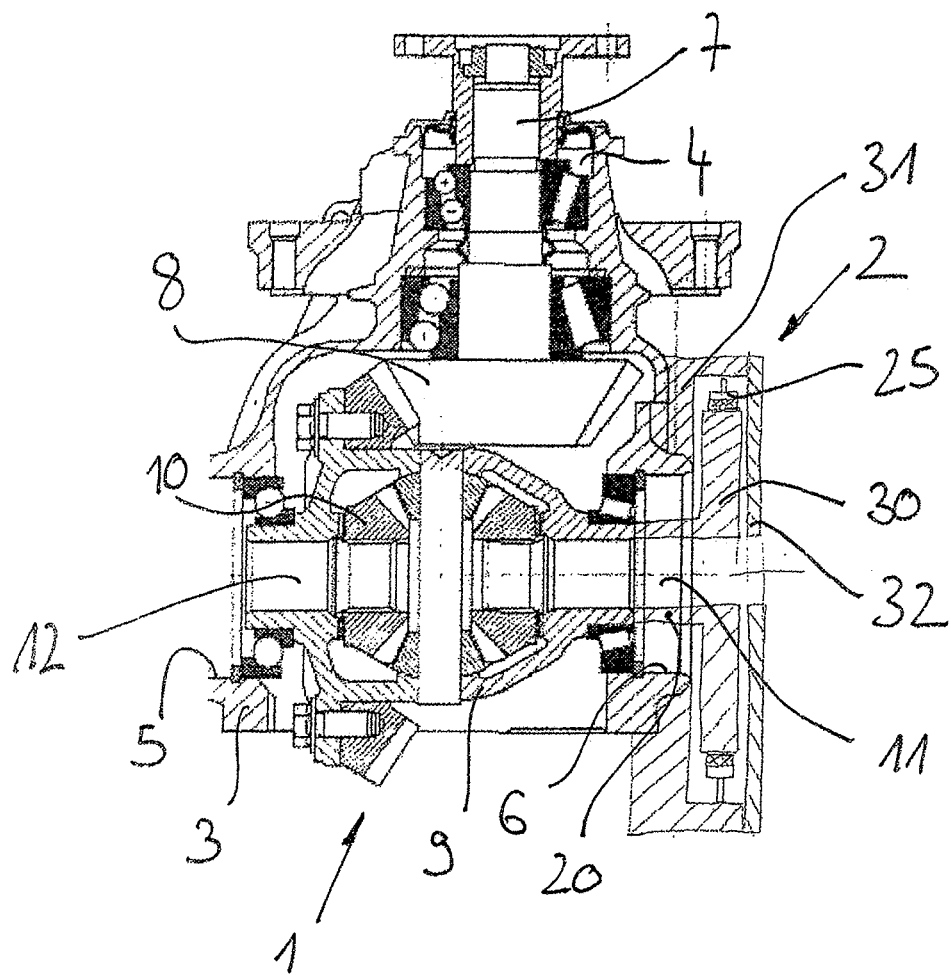
FIG. 2: shows a second embodiment of the invention.

An alternative form of the brake device 2 is illustrated in FIG. 2. Here, the brake drum is designed as a radial brake disk 30 which is connected to the differential cage 9 and the wide lateral surface of which serves as a cylindrical frictional surface. The brake shoes 25 are located on a pot-like carrier plate 31 and, for the purpose of operating the brake, are pressed inward against the frictional surface. A cover 32 closes the carrier plate 31 to the outside. It is possible to connect the radial brake disk 30 directly to the drive shaft 7 in the case of this arrangement too.

In principle, it is true of both designs that the brake drum 21 or radial brake disk 30 is coupled not only to the differential cage 9 but, instead, directly to the respective output shaft 11, 12. In this case, the two output shafts 11, 12 should be provided with a brake device 2. However, it would also be conceivable for a brake device 2 which acts on the differential cage 9 to be provided, while a brake device 2 is provided on the other side of the differential housing, which brake device is connected to the output shaft there.

Furthermore, only one brake device 2 which acts on the drive shaft 7 can be provided. According to the illustrations in FIGS. 1 and 2, the brake device is fastened to the inlet opening 4 instead of one of the outlet openings 5, 6.

Figure 3:
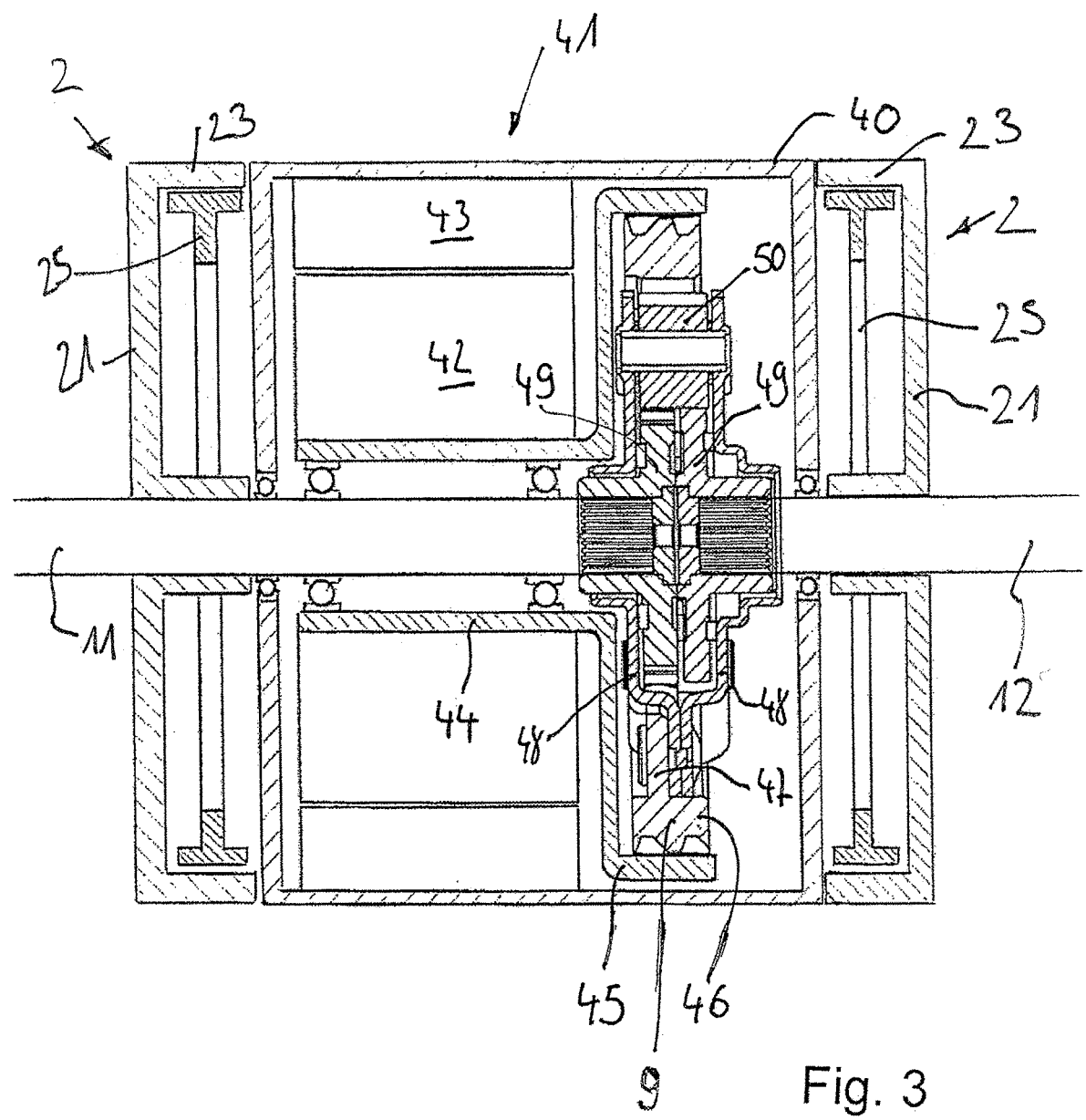
FIG. 3: shows a third embodiment of the invention.

FIG. 3 describes a third embodiment of the invention, in which the brake devices 2 are arranged on a cylindrical housing 40 for an electric motor 41 and a differential cage 9.

The rotor 42 and stator 43 are only symbolically indicated here in order to show that any form of electric motor is possible.

The output shaft 44 of the electric motor 41 is of hollow design and widens to form a flat pot 45 in which the differential cage 9 is held, so that it establishes a rotationally fixed connection with the output shaft 44.

The differential housing 3 consists of an annular carrier 46 which has an inwardly facing flange 47 to which two sheet-metal half-shells 48 are fastened, wherein output gears 49 which receive the output shafts 11, 12 in a rotationally fixed manner in their centers are mounted in the hollow space formed in this way.

The two output gears 49 engage into a compensating gear 50 which is rotatably mounted deaxially in relation to the output shafts 11, 12 between the two half-shells 48.

One of the output shafts 11 is passed through the hollow output shaft 44 of the electric motor 41 and rotatably mounted there. Further bearings are located in the end sides of the housing 40.

As has already been described further above, brake drums 21 are fitted in a rotationally fixed manner to the output shafts 11, 12 outside the housing 40. Brake shoes 25 are mounted on the end sides of the housing 40, this not being explained in any detail here, which brake shoes can be pressed against an encircling wall 23 of the brake drum 21 by spreading means, not illustrated, in order to exert a braking moment onto the output shafts 11, 12. This corresponds to the design according to FIG. 1. However, a design of the brake device as is illustrated in FIG. 2 is also conceivable.

| List of reference symbols | |
|---|---|
| 1 | Differential |
| 2 | Brake device |
| 3 | Differential housing |
| 4 | Inlet opening |
| 5 | Outlet opening |
| 6 | Outlet opening |
| 7 | Drive shaft |
| 8 | Bevel gear |
| 9 | Differential cage |
| 10 | Bevel gear arrangement |
| 11 | Output shaft |
| 12 | Output shaft |
| 20 | Extension sleeve |
| 21 | Brake drum |
| 22 | Base |

-continued

| List of reference symbols | |
|---|---|
| 23 | Encircling wall |
| 25 | Brake shoe |
| 26 | Carrier plate |
| 27 | Connection |
| 30 | Radial brake disk |
| 31 | Carrier plate |
| 32 | Cover |
| 40 | Cylindrical housing |
| 41 | Electric motor |
| 42 | Rotor |
| 43 | Stator |
| 44 | Output shaft |
| 45 | Pot |
| 46 | Carrier |
| 47 | Flange |
| 48 | Half-shells |
| 49 | Output gears |
| 50 | Compensating gear |

The invention claimed is:

1. A differential having a brake device, comprising:
a drive shaft,
two output shafts,
a differential housing which has an inlet opening for the drive shaft and two opposite outlet openings for the output shafts,
a differential cage and
at least two brake devices,
wherein each of the at least two brake devices is a drum brake which has a passive element, which exhibits a cylindrical frictional surface, and brake shoes, frictional surfaces of which brake shoes can be placed against the cylindrical frictional surface of the passive element, wherein in each case the passive element of a respective one of the at least two brake devices is fastened to the differential cage and/or a respective one of the two output shafts in such a way that the cylindrical frictional surface is installed coaxially in relation to the respective opening of the respective one of the two output shafts, and the brake shoes are held in a pivotable manner on a carrier plate which is flange-connected to an edge of the respective opening.

2. The differential as claimed in claim 1, wherein the passive element is formed by a pot comprising a base and an encircling wall, wherein an inner side of the wall forms the cylindrical frictional surface, the open side of the pot faces the differential housing of the differential, and the brake shoes are arranged within the pot.

3. The differential as claimed in claim 1, wherein the passive element is formed by a radial brake disk, the lateral surface of which radial brake disk forms the cylindrical frictional surface.

4. The differential as claimed in claim 3, wherein a cover is detachably fastened on the carrier plate, so that the carrier plate, the brake shoes and the radial brake disk are enclosed.

5. The differential as claimed in claim 1, wherein the passive element of one brake device of the at least two brake devices is coupled to the differential cage, and the passive element of another brake device of the at least two brake devices is coupled to one of the output shafts.

6. The differential as claimed in claim 5, wherein the differential cage, on a side which is coaxial in relation to the output shaft there, is extended by means of an extension sleeve in order to allow fastening of the passive element.

7. The differential as claimed in claim 1, wherein the carrier plate projects radially outward beyond the differential housing, and has, on the carrier plate's rear side, a hydraulic or electrical connection for an actuating device of the brake shoes.

8. The differential as claimed in claim 1, wherein the differential cage is coupled to an output shaft of an electric motor, wherein the output shaft of the electric motor is of hollow design and runs coaxially in relation to one of the output shafts of the differential.

9. The differential as claimed in claim 8, wherein a compensating gear in form of a spur gear is mounted deaxially in relation to the output shafts in the differential cage, and in that the output shafts, by way of in each case one output gear which is designed as a spur gear, engage into the toothing of the compensating gear.

10. The differential as claimed in claim 8, wherein the electric motor and the differential cage are accommodated in a common cylindrical housing, wherein the output shafts are passed through the end side of the housing, and in each case one brake device of the at least two brake devices is arranged on one or both end side/sides.

* * * * *